Nov. 6, 1934.    G. C. FULLMER    1,979,828
HOLDER FOR COSMETICS AND THE LIKE
Filed June 8, 1931
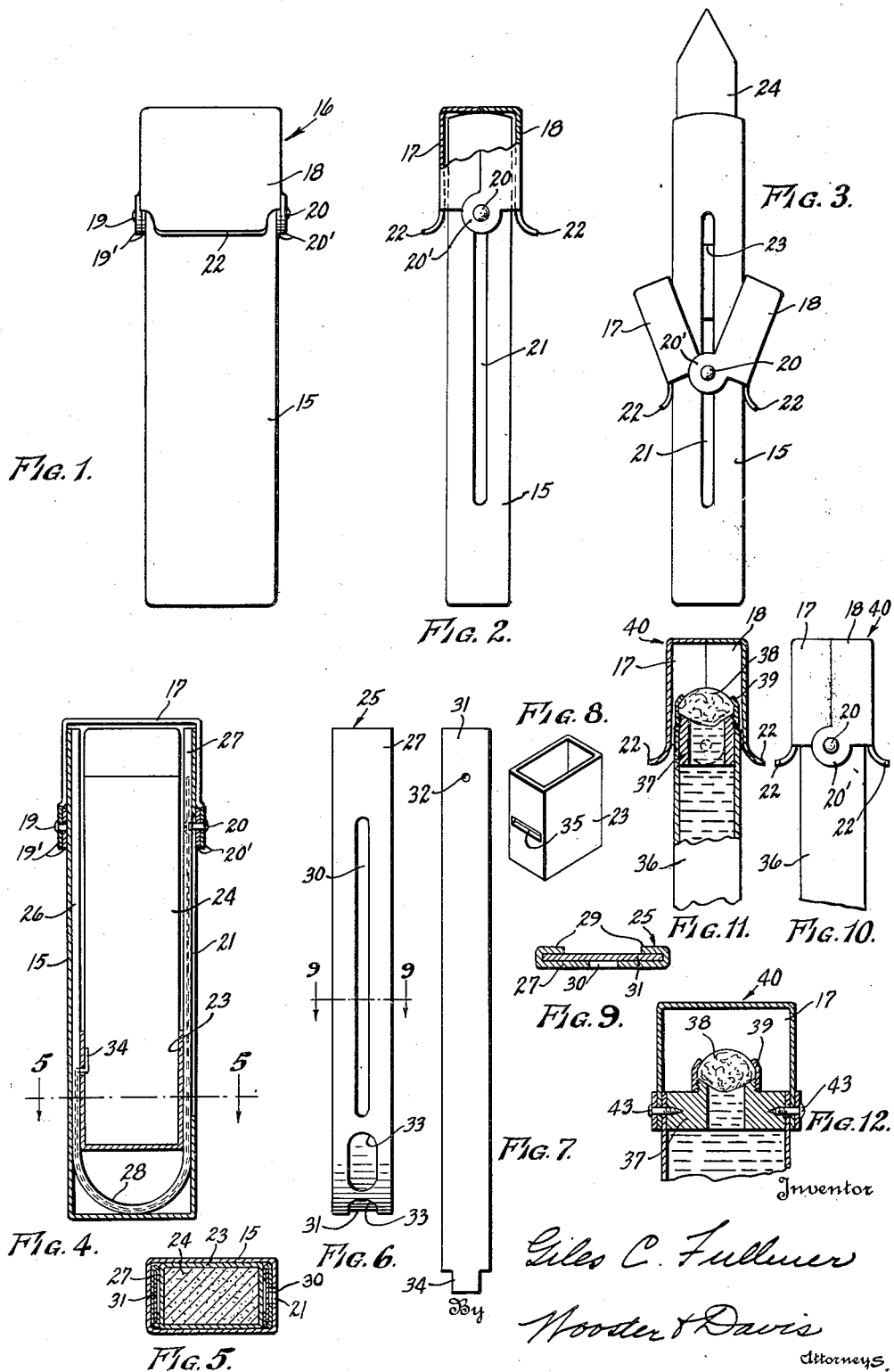

Patented Nov. 6, 1934

1,979,828

UNITED STATES PATENT OFFICE 1,979,828

HOLDER FOR COSMETICS AND THE LIKE

Giles C. Fullmer, Bridgeport, Conn., assignor to The Bridgeport Metal Goods Manufacturing Company, Bridgeport, Conn., a corporation of Connecticut Application June 8, 1931, Serial No. 542,858

14 Claims. (Cl. 206—56)

This invention relates to new and useful improvements for holders for cosmetics and the like.

An object of the invention is to provide a cosmetic or like holder including a receptacle or body casing having an open end and a cover for said open end, the cover comprising complementary parts pivoted for movement away from one another to expose the open end of the receptacle or casing and adapted to be moved toward one another to close the end of the receptacle or casing.

Another object is to provide a holder for cosmetics and the like, the holder including a receptacle or casing having an open end, a cover for the receptacle, a carrier in the receptacle and adapted to receive a cosmetic such as a lipstick or the like, and means whereby on movement of the cover to expose the open end of the receptacle the carrier is moved toward the open end of the receptacle to expose the contents of the carrier.

A further object is to provide a cosmetic holder including a receptacle or casing having an open end, a cover or closure for said end of the receptacle, a carrier in the receptacle and adapted to receive a cosmetic and movable toward and from the open end of the receptacle, said cover being movable toward and from the open end of the receptacle, and means connecting the cover and carrier whereby on movement of the cover in a direction away from the open end of the receptacle the carrier is moved toward said end and on movement of the cover towards said open end the carrier is moved away from the open end.

An additional object is to provide a cosmetic holder including a receptacle or casing open at one end, a substantially U-shaped guide within the receptacle and having its connecting portion or the portion between its arms disposed toward the closed end of the receptacle, a flexible means slidable in the guide, a carrier in the receptacle and adapted to be moved toward and from the open end of the receptacle on movement of the flexible member, said carrier adapted to receive a cosmetic, a closure for the receptacle, said closure connected with one end of the flexible member, and said closure movable along the outer surface of the receptacle and adapted on such movement to act through the flexible member to move the carrier toward and from the open end of the receptacle to expose the cosmetic for use and after use withdraw it into the receptacle.

Other objects and advantages will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims to which claims reference is to be had for a definition of the invention.

In the drawing:

Fig. 1 is a side elevational view of my improved holder with the cover or closure in closed position;

Fig. 2 is an edge view thereof, a portion of the cover or closure being broken away;

Fig. 3 is an edge view of the improved holder open and with a cosmetic projected therefrom and ready for use;

Fig. 4 is a vertical sectional view through the holder when closed;

Fig. 5 is a transverse sectional view on the line 5—5 of Fig. 4;

Fig. 6 is a side elevational view of the guide removed from the holder;

Fig. 7 is a similar view of the slidable connecting means for connecting the cover and carrier;

Fig. 8 is a perspective view of the carrier removed from the holder;

Fig. 9 is a sectional view of the guide on an enlarged scale, the view being taken substantially along the line 9—9 of Fig. 6;

Fig. 10 is an edge view in elevation of a modified form of holding means;

Fig. 11 is a view of the holder of Fig. 10 the upper portion thereof being in section; and Fig. 12 is a view somewhat similar to Fig. 11 but taken at right angles thereto.

Referring in detail to the drawing and first to the form of the invention as shown in Figs. 1 through 9 the improved cosmetic holder, shown in these figures as a lipstick or the like holder includes a relatively deep or elongated receptacle or casing 15 substantially rectangular in cross section. To the upper end of this receptacle 15 is applied a cover or closure 16 including a pair of sections or members 17 and 18 respectively. The sections 17 and 18 are complemental and each forms one half of the closure 16. Further, the sections are pivoted together at their lower edges as by the pivots 19 and 20 whereby the sections may assume an abutting relationship closing the open end of the receptacle as shown in Figs. 1 and 2 or an open or spread apart relationship exposing the open end of the receptacle 15 as shown in Fig. 3.

The pivot 19 connecting the sections of the cover member at one edge of the receptacle extends only through overlapping portions 19' of the cover sections while the pivot 20 connecting overlapping portions 20' of the cover sections at the other edge of the receptacle is somewhat longer and extends through a slot 21 in an edge wall of the receptacle for a purpose to be described. To facilitate the opening of the cover sections they may at their lower edges at the sides of the receptacle be provided with outwardly extending flanges or finger pieces 22 adapted to be pressed toward each other by a thumb and finger to rock the cover sections about their pivots and into open position.

Within the receptacle 15 is a carrier 23 (see Fig. 8) and this carrier is adapted to receive the inner end portion of cosmetic such for example as a lipstick 24 (see Fig. 4). Further, the carrier is adapted to be moved in the receptacle or casing and in a direction longitudinally of the receptacle whereby as the carrier is moved toward the open end of the receptacle the cosmetic 24 will be projected for use and as the carrier is moved into the receptacle the cosmetic will be withdrawn. Preferably, the carrier 23 has a cross sectional configuration corresponding with that of the receptacle and the cosmetic may also be of a similar shape.

Means are provided for reciprocating or moving the carrier in the receptacle, and as here disclosed this means is so constructed that movement of the cover sections brings about movement of the carrier whereby as the cover sections are moved away from the open end of the receptacle the carrier is moved toward said end, and whereby when the cover sections are moved toward the open end of the receptacle to close the same the carrier is moved away from said end. The means for bringing about this movement of the carrier includes a substantially U-shaped guide member 25 arranged in the receptacle and including arms 26 and 27 arranged one against the inner surface of each edge wall of the receptacle with the curved connecting portion 28 of the guide resting against the bottom wall of the receptacle as shown in Fig. 4.

Guide 25 may be formed from a strip of metal and the edge portions 29 of the strip are bent over and in spaced relation to the body portion of the strip as best shown in Fig. 9. Further, the guide is provided with a relatively long slot 30 in portion 27 corresponding with the slot 21 in an edge wall of the receptacle, and when the guide is arranged in the receptacle the disposition of the guide is such that its slot 30 is arranged to register with the slot 21 in the receptacle. The purpose of this arrangement will later fully appear.

Arranged to operate in the guide 25 and between the body portion of the guide and the bent over edge portions 29 thereof, is a flat flexible metal strip 31 such as a flexible tempered steel strip. This strip adjacent one end has an opening or perforation 32 adapted to receive the pivot pin 20 above referred to whereby the strip will be secured to such pivot. The strip is slidable in the guide, and the pin 20 in addition to extending through the slot 21 in the receptacle also extends through the slot 30 in the guide 25 whereby the pin connects with the strip 31 within the guide. To reduce the area of engagement between the strip and guide and thus reduce the friction whereby the strip will slide more easily through the guide, portions of the guide may be cut away as suggested at 33.

At its end opposite the end having the hole or opening 32 the strip 31 is secured to the carrier 23 by any suitable means. In the present construction the end of the strip is reduced or cut away to provide a tongue 34. The width of this tongue 34 is such that it may extend laterally out of the guideway and operate in the space between the bent over edge portions 29 of the guide. In one edge wall of the carrier 23 is a slot 35 and the tongue 34 of the strip is passed through this slot and bent against the edge wall of the carrier as clearly shown in Fig. 4. Therefore, it will be seen that one end portion of the strip 31 is connected with the cover of the receptacle while the other end portion of the strip is connected with the carrier.

To operate the improved cosmetic holder it is but necessary to press inwardly on the finger pieces or flanges 22 of the respective cover sections, most conveniently with the thumb and first finger, whereby to swing the cover sections apart and to then either draw the cover sections downwardly or backwardly along the receptacle or casing 15 or to push against the closed end of the receptacle to push the receptacle through between the cover sections. Either action gives the same result since the pin or pivot 20 will have its position moved from the upper or outer end of the slot 21 toward the inner end thereof and such movement of the pin will result in a sliding of the strip 31 through the guide 25 and the moving of the carrier upwardly or outwardly of the receptacle toward the open end of the receptacle. This action will of course result in the cosmetic being projected for use.

When using the cosmetic the cover sections should be held between the thumb and finger in a manner to press the flanges 22 against the sides of the receptacle whereby to prevent the pressure on the cosmetic bringing about a movement of the carrier in a direction inwardly of the receptacle. The receptacle 15, may of course, be ornamented or colored to suit and the sections 17 and 18 of the cover 16 may be ornamented or colored as desired. The improved holder includes but a relatively few parts and is simply and easily operated to project the cosmetic for use and, of course, the operation of withdrawing the cosmetic into the receptacle is but the reverse of the operation for projecting it. That is, the cover sections are simply moved along the receptacle toward the open end thereof and as they pass the open end are snapped toward each other and into abutting relationship by the press of the thumb and finger pressing against the outer walls of the hinged members above the flanges or ears 22, it being understood in ordinary operation that the thumb and finger grip the lower parts of the hinged member and rest in the curve of the flanges 22 so that the hinged members can be easily shifted in either direction as desired. If the cover sections should be pushed upward by pressure of the thumb and finger on the lower sides of the ears or flanges 22 the cover sections will be closed in the same manner by this pressure when the sections reach the open end of the receptacle and upward movement is arrested by pin 20 engaging the upper end of slot 21.

In Figs. 10, 11 and 12 a cover means substantially the same as that shown in the other figures is applied to a receptacle containing a solution for killing the nicotine in cigarettes. The receptacle in these figures is designated 36 and in its open upper end receives a nipple 37 to the upper end of which is secured a sponge or the like 38 as by means of a collar 39 threaded or otherwise secured to the upper end of the nipple. Obviously, the solution in the receptacle 36 will keep the sponge 38 moistened.

The cover 40 including the sections 17 and 18 the same as in Figs. 1 to 4 serves normally to enclose the upper end of the receptacle 36. The sections 17 and 18 are pivotally mounted on screws or studs 43 anchored in the nipple or throat member 37 as clearly shown in Fig. 12. The lower edges of the sections 17 and 18 may be out-turned as shown at 22 to provide finger pieces adapted to be pressed toward the sides of the receptacle the same as in the first form to move the sections apart and expose the sponge. Preferably the solution in the receptacle 36 is such that when the end of a cigarette is pressed against the sponge when the cover sections are open it will moisten the end of the cigarette and will negative or counteract nicotine. Such solutions can be purchased on the market.

Having thus set forth the nature of my invention, what I claim is:

1. In a holder of the class described, an open ended receptacle, a cover for said end of the receptacle, said cover comprising a pair of sections, means pivotally connecting said sections whereby they may be rocked in a direction away from each other to expose the open end of the receptacle and toward each other to close the open end of the receptacle, said receptacle having a slot in a wall thereof, said pivoting means for the sections extending through the slot in the wall of the receptacle whereby said sections are mounted for movement longitudinally of the body when said sections are in their open positions.

2. In a cosmetic holder, a receptacle open at one end, a cover for said end of the receptacle, a guide in the receptacle, a flexible element in the guide and connected at one end to the cover to be moved thereby, a carrier in the receptacle and movable toward and from the open end thereof and connected with the other end of the flexible element, said cover comprising a pair of sections, means pivotally connecting said cover sections whereby they are adapted to be swung laterally of the receptacle and moved longitudinally thereof, said pivotal connecting means connecting said cover sections with said flexible element whereby on movement of the cover sections longitudinally of the receptacle said flexible element is moved in the guide, and said flexible element adapted to transmit such longitudinal movement of the cover sections to the carrier whereby to move the carrier toward the open end of the receptacle as the cover sections are moved away from said end.

3. In a cosmetic holder, a receptacle open at one end, a cover for said end of the receptacle, a flexible element in the receptacle and connected at one end to the cover to be shifted thereby, a carrier in the receptacle and movable toward and from the open end thereof and connected with the other end of the flexible element, said cover comprising a pair of sections, means pivotally mounting said sections for swinging movement laterally of the receptacle and for movement longitudinally of the receptacle, said means connecting said cover sections with said flexible element whereby on movement of the cover sections longitudinally of the receptacle said flexible element is moved in the guide, and said flexible element adapted to transmit such longitudinal movement of the cover sections to the carrier whereby to move the carrier toward the open end of the receptacle as the cover sections are moved away from said end.

4. In a cosmetic holder, a receptacle open at one end, a cover for said end of the receptacle, a flexible element in the receptacle and connected at one end to the cover to be shifted thereby, a carrier in the receptacle and movable toward and from the open end thereof and connected with the other end of the flexible element, said cover comprising a pair of pivotally mounted sections adapted to be swung laterally of the receptacle and moved longitudinally thereof, said receptacle having a longitudinal slot in a wall thereof, a pivot for said sections passing through said slot in the wall of the receptacle and serving as the connecting means between the cover and the flexible element, and said flexible element adapted to transmit longitudinal movement of the cover sections to the carrier whereby to move the carrier toward the open end of the receptacle as the cover sections are moved away from said end.

5. In a cosmetic holder, a receptacle open at one end, a cover for said end of the receptacle, a guide in the receptacle, said guide having an open side, a flexible element in the guide and having a reduced portion extending through the open side of the guide, a carrier in the receptacle and movable toward and from the open end thereof, said carrier having a slot in the wall thereof, said flexible element having its reduced portion passed through said slot and bent over whereby to connect the element and carrier, said receptacle having an elongated slot in a wall thereof, said cover comprising a pair of sections pivotally connected and having a pivot extending through the slot in the wall of the receptacle and connected with an end of the flexible element whereby movement of the cover sections will be transmittted to the carrier and said cover sections adapted to be swung laterally to clear the end of the receptacle and then disposed at the sides of the receptacle whereby to bring about movement of the carrier toward the open end of the receptacle.

6. In a cosmetic holder, a receptacle open at one end, said receptacle having an elongated slot in a wall thereof, a cover for the open end of the receptacle, a guide in the receptacle and comprising a substantially U-shaped member open along its inner side, said guide having an elongated slot registering with the slot in the receptacle, a flexible element in the guide and having a reduced portion extending through the open side of the guide, a carrier in the receptacle and movable toward and from the open end thereof, said carrier having a slot in a wall thereof, said flexible element having its reduced portion passed through said slot and bent over whereby to connect the element and carrier, said cover comprising a pair of sections, means pivotally connecting said sections, said means extending through the registering slots in the receptacle and guide and connected with an end of the flexible element whereby movement of the cover sections will be transmitted to the flexible element, said cover sections adapted to be swung laterally to clear the end of the receptacle and then disposed at the sides of the receptacle whereby to bring about movement of the carrier toward the open end of the receptacle, and said guide having portions thereof cut away to reduce friction between the guide and the flexible element.

7. In a cosmetic holder, a receptacle open at one end, a cover for said end of the receptacle, a guide in the receptacle, said guide having an open side, a flexible element in the guide and having a reduced portion extending through the open side of the guide, a carrier in the receptacle and movable toward and from the open end thereof, said carrier having a slot in a wall thereof, said flexible element having its reduced portion passed through said slot and bent over whereby to connect the element and carrier, said flexible element connected at one end to said cover to be shifted thereby, said cover comprising a pair of pivotally mounted sections adapted to be swung laterally of the receptacle and moved longitudinally thereof, and said flexible element adapted to transmit such longitudinal movement of the cover sections to the carrier whereby to move the carrier toward the open end of the receptacle as the cover sections are moved away from said end.

8. In a cosmetic holder, a receptacle open at one end, said receptacle having an elongated slot in a wall thereof, a cover for the open end of the receptacle, a guide in the receptacle and comprising a substantially U-shaped member open along its inner side, said guide having an elongated slot registering with the slot in the receptacle, a flexible element in the guide and having a reduced portion extending through the open side of the guide, a carrier in the receptacle and movable toward and from the open end thereof, said carrier having a slot in a wall thereof, said flexible element having its reduced portion passed through said slot and bent over whereby to connect the element and carrier, means pivotally mounting said cover and extending through the registering slots in the receptacle and guide and connected with an end of the flexible element whereby movement of the cover will be transmitted to the flexible element, and said cover adapted to be swung laterally to clear the end of the receptacle and then dispose at the sides of the receptacle whereby to bring about movement of the carrier toward the open end of the receptacle.

9. In a holder of the class described, a receptacle open at one end, a closure for said end of the receptacle, said closure comprising two sections each substantially U-shaped in cross section and including side flanges extending longitudinally of the receptacle and an end wall at the outer ends of the side flanges, means passing through and pivoting the side flanges of each section to the side flanges of the other section at the opposite outer sides of the receptacle inwardly of the open end thereof, one of said pivoting means passing through a side wall of the receptacle and pivoting the sections to the receptacle, and said sections rockable on said pivoting means to dispose the side flanges and end wall of one section in abutting engagement with the side flanges and end wall of the other section whereby to completely enclose the open end of the receptacle.

10. In a cosmetic holder, a receptacle open at one end, a cover for said end of the receptacle comprising a pair of pivotally mounted sections adapted to move laterally toward and from each other in opposite directions to close and expose the open end of the receptacle, said sections being also shiftable on the receptacle, each of said sections including an outer connecting wall extending generally lengthwise of the receptacle, a carrier in the receptacle and movable toward and from the open end thereof, an element in the receptacle connected with the carrier and the cover whereby shifting of the latter will shift the carrier, and a downwardly and outwardly extending finger piece on the lower edge of the connecting wall of each section at the side wall of the receptacle to swing the section outwardly and providing finger pieces at opposite sides of the receptacle to be engaged simultaneously by a thumb and finger and rocked toward the receptacle and drawn therealong to operate the cover sections and shift the carrier.

11. In a cosmetic holder, a receptacle open at one end, a carrier in the receptacle movable toward and from said end, a cover for said open end of the receptacle comprising a pair of sections each including an outer wall extending generally lengthwise of the receptacle, means pivotally connecting said sections to one another for movement laterally toward and from each other to close and open the receptacle and connecting them to the receptacle for movement longitudinally thereof, a flexible element in the receptacle connected with the carrier and the cover whereby movement of the latter longitudinally of the receptacle will shift the carrier, and a downwardly and outwardly extending finger piece on the lower edge of the connecting wall of each section at the side wall of the receptacle to swing the section outwardly and providing finger pieces at opposite sides of the receptacle to be gripped simultaneously by a thumb and finger and rocked toward the receptacle and drawn therealong to operate the cover sections and shift the carrier.

12. In a cosmetic holder, a receptacle open at one end, a carrier in the receptacle movable toward and from said open end, a guide in the receptacle having an open side, a flexible element in the guide having a reduced portion extending through the open side of the guide and connected with the carrier, said flexible element being connected with the cover to be shifted thereby, said cover comprising a pair of pivotally mounted sections adapted to swing laterally of the receptacle and be moved longitudinally thereof, and said flexible element adapted to transmit such longitudinal movement of the cover sections to the carrier whereby to move the carrier toward the open end of the receptacle as the cover sections are moved away from said end.

13. In a cosmetic holder, a receptacle open at one end, a carrier in the receptacle and movable toward and from said end, a cover for said end of the receptacle and comprising a pair of sections, means pivotally connecting said sections to one another for movement toward and from one another and connecting them to the receptacle for movement longitudinally thereof, and means in the receptacle and connected with the carrier and cover whereby movement of the latter longitudinally of the receptacle results in movement of the carrier.

14. In a cosmetic holder, a receptacle open at one end, a carrier in the receptacle and movable toward and from said end, a cover for said end of the receptacle and comprising a pair of sections having overlapping portions, means passing through said over-lapping portions and pivotally connecting said sections to one another for movement toward and from one another and connecting to the receptacle for movement longitudinally thereof, and means in the receptacle and connected with the carrier and cover whereby movement of the latter longitudinally of the receptacle results in movement of the carrier.

GILES C. FULLMER.